(12) United States Patent
Tsunashima et al.

(10) Patent No.: US 7,912,989 B2
(45) Date of Patent: Mar. 22, 2011

(54) NETWORK INTERFACE FOR DECREASING POWER CONSUMPTION

(75) Inventors: Nobuaki Tsunashima, Osaka (JP); Keitaro Ado, Hyogo (JP); Yasunori Nakayama, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 881 days.

(21) Appl. No.: 10/147,111

(22) Filed: May 15, 2002

(65) Prior Publication Data
US 2002/0199026 A1    Dec. 26, 2002

(30) Foreign Application Priority Data
May 16, 2001  (JP) ................. 2001-146467

(51) Int. Cl.
*G06F 15/16* (2006.01)
(52) U.S. Cl. ........................ 709/253; 709/250
(58) Field of Classification Search .................. 710/129, 710/128; 713/322, 323, 324, 600, 500; 709/224, 709/250, 318, 253; 327/156, 157; 395/750
See application file for complete search history.

(56) References Cited

U.S. PATENT DOCUMENTS

| | | | | | |
|---|---|---|---|---|---|
| 5,465,926 | A | * | 11/1995 | Brown | 246/34 B |
| 5,903,746 | A | * | 5/1999 | Swoboda et al. | 713/501 |
| 6,049,885 | A | * | 4/2000 | Gibson et al. | 713/324 |
| 6,193,422 | B1 | * | 2/2001 | Belt et al. | 713/320 |
| 6,477,605 | B1 | * | 11/2002 | Taki et al. | 710/302 |
| 6,496,938 | B1 | * | 12/2002 | Fry et al. | 713/322 |
| 6,515,519 | B1 | * | 2/2003 | Miyazaki et al. | 327/105 |
| 6,585,431 | B1 | * | 7/2003 | Okamoto | 398/131 |
| 6,665,802 | B1 | * | 12/2003 | Ober | 713/320 |
| 6,687,774 | B2 | * | 2/2004 | Milios et al. | 710/72 |
| 6,816,976 | B2 | * | 11/2004 | Wright et al. | 713/323 |
| 2003/0098730 | A1 | * | 5/2003 | Miyazaki et al. | 327/158 |
| 2003/0165152 | A1 | * | 9/2003 | Mills et al. | 370/422 |

OTHER PUBLICATIONS

Applicant Admitted Prior Art (Date Unknown).*
Anderson et al hereinafter Anderson "1394 Open Host Controller Interface Specification", Microsoft et al, 2000, pp. 1-191.*
Microsoft "Plug and Play Speciffication" Microsft, 1999, pp. 1-10.*

* cited by examiner

*Primary Examiner* — Karen C Tang
(74) *Attorney, Agent, or Firm* — Cooper & Dunham LLP

(57) ABSTRACT

A network interface is provided, in which it has an active mode and at least one of a disconnect mode and a suspend mode, and performs a predetermined process when a release condition of the disconnect mode or the suspend mode is satisfied. The network interface includes a driving control circuit for stopping at least a part of driving clock generation circuits included in the network interface until the release condition of the disconnect mode or the suspend mode is satisfied from the time when the disconnect mode or the suspend mode is established, wherein the driving control circuit operates irrespective of a clock signal.

20 Claims, 10 Drawing Sheets

FIG.1

IEEE CABLE 150

NETWORK INTERFACE FOR DECREASING POWER CONSUMPTION

BACKGROUND OF THE INVENTION

1. Field of the Invention

The present invention relates to a network interface having at least one of a disconnect mode and a suspend mode in addition to an active mode.

2. Description of the Related Art

An IEEE1394 bus system is standardized as a high speed bus system. The IEEE1394 bus system is a serial bus system in which electrical devices with an interface board in conformity with the IEEE1394.a standard are connected by a standard cable in conformity with the IEEE1394 standard (which will be simply called an IEEE cable). A twisted pair cable is adopted as the IEEE cable, in which the twisted pair cable includes two pairs of two twisted wires in which differential signal is transmitted.

In addition to an active mode, a disconnect mode and a suspend mode are defined in the IEEE board. The active mode is a mode established when information such as packet data is sent/received between nodes. The disconnect mode is a mode established when an opposite node is not connected. The suspend mode is a mode in which nodes are connected but packet data is not sent/received between the nodes.

The active mode and the suspend mode are established by a PHY chip in the IEEE board. The PHY chip includes a cable I/F and a digital control part for processing a signal output from the cable I/F.

The cable I/F in the IEEE board outputs send/receive data to the digital control part. In addition, the cable I/F outputs various signals including a connect detection signal and a bias detection signal, in which the connect detection signal enters an asserted state (becomes Low) when an opposite node is connected, and the bias detection signal enters an asserted state (becomes High) when packet data is sent/received.

The digital control part establishes the disconnect mode, the suspend mode and the active mode according to a value of the connect detection signal and the bias detection signal. More specifically, the disconnect mode is established when the connect detection signal is in a negate state, so that functions are disabled except for the function for executing a mode change process according to change of the connect detection signal.

The digital control part establishes the suspend mode when the connect detection signal is changed to the assert state while the bias detection signal is in the negate state, so that functions are disabled except for the function for executing a mode changing process for the change of the connect detection signal and the bias detection signal. In the suspend mode, when the connect detection signal is changed to the negate state, the mode is changed to the disconnect mode. When the bias detection signal is changed to the assert state, the mode is changed to the active mode, so that functions are enabled except for the function for processing the connect detection signal.

The suspend mode provided in the interface board in conformity with the standard of the IEEE1394.a is a mode provided for decreasing power consumed by each IEEE board when information such as packet data is not exchanged between electronic apparatuses connected by the IEEE cables.

However, while the IEEE board is placed in the suspend mode, a clock signal generation part in the PHY chip continues to operate. In the PHY chip, high speed data processing is performed at a rate of 400 Mbps at the maximum. Therefore, the clock signal generation circuit generates a clock signal with very high frequency, in which a large amount of power is consumed for generating the high frequency clock signal.

It can be considered to stop the operation of the clock signal generation part for power saving. However, if the operation of the clock signal generation part is stopped in the suspend mode, all of the signal processing functions in the PHY chip including a process of the connect detection signal detected in the cable I/F are disabled. Thus, for example, the changing process from the suspend mode to the disconnect mode can not be performed even when the electronic apparatus is disconnected from the IEEE cable. In addition, the IEEE board can not detect information such as packet data sent from a connected electronic apparatus, so that there occurs a problem in that the mode can not be changed to the active mode. When the IEEE board is in the disconnect mode, the same problem occurs if the clock signal generation part is disabled.

SUMMARY OF THE INVENTION

An object of the present invention is to provide a network interface having a function for effectively decreasing power consumption in the disconnect mode and in the suspend mode.

The above object can be achieved by a network interface having an active mode and at least one of a disconnect mode and a suspend mode, the network interface performing a predetermined process when an establishment condition or release condition of the disconnect mode or the suspend mode is satisfied, the network interface including:

a driving control circuit for stopping at least a part of driving clock generation circuits included in the network interface until the release condition of the disconnect mode or the suspend mode is satisfied from the time when the disconnect mode or the suspend mode is established;

wherein the driving control circuit operates irrespective of a clock signal.

In the network interface, the driving control circuit may includes:

an event detection circuit for detecting a change of a state between the network interface and a connected node (connecting or disconnecting a node, start of exchanging packet data and the like) as occurrence of an event; and a clock control circuit for stopping at least a part of driving clock generation circuits included in the network interface until occurrence of the event is detected by the event detection circuit from the time when the disconnect mode or the suspend mode is established.

In the network interface, the event detection circuit may detect a change of a state between the network interface and a connected node, or a change of a state of a predetermined signal in the network interface as occurrence of the event.

In addition, the network interface may by in conformity with the IEEE1394.a standard; and the event detection circuit may detect occurrence of the event on the basis of variation of at least one of a connect detection signal and a bias detection signal, in which the connect detection signal is detected by a connect detection circuit in a cable I/F provided in the network interface and the bias signal is detected by a bias detection circuit in the cable I/F.

In the network interface, the event detection circuit may detect occurrence of the event on the basis of variation of an LPS signal which is output from an LINK chip provided in the network interface.

BRIEF DESCRIPTION OF THE DRAWINGS

Other objects, features and advantages of the present invention will become more apparent from the following detailed description when read in conjunction with the accompanying drawings, in which:

FIG. 1 shows an example of a network using a bus system of the IEEE 1394.a;

DETAILED DESCRIPTION OF THE PREFERRED EMBODIMENTS

(1) A Brief Description of the Present Invention

A network interface of the present invention is a network interface in conformity with the IEEE1394.a standard, for example, and includes an active mode and at least one of a disconnect mode and a suspend mode, and performs a predetermined process when a release condition of the disconnect mode or the suspend mode is satisfied. The network interface includes a driving control circuit for stopping at least a part of driving clock generation circuits included in the network interface according to establishment of the disconnect mode and the suspend mode, and restarting the stopped driving clock generation circuits when a release condition of the disconnect mode or the suspend mode is satisfied, wherein the driving control circuit operates irrespective of a clock signal.

By adopting this configuration, power consumption in the clock signal generation circuit can be decreased, so that power consumption of the interface in the disconnect mode or the suspend mode can be effectively decreased.

In the following, the above-mentioned network interface of the present invention will be described with reference to figures as embodiments in which the present invention is applied to a bus system of the IEEE1394.a.

(2) Embodiment

Figure 1:
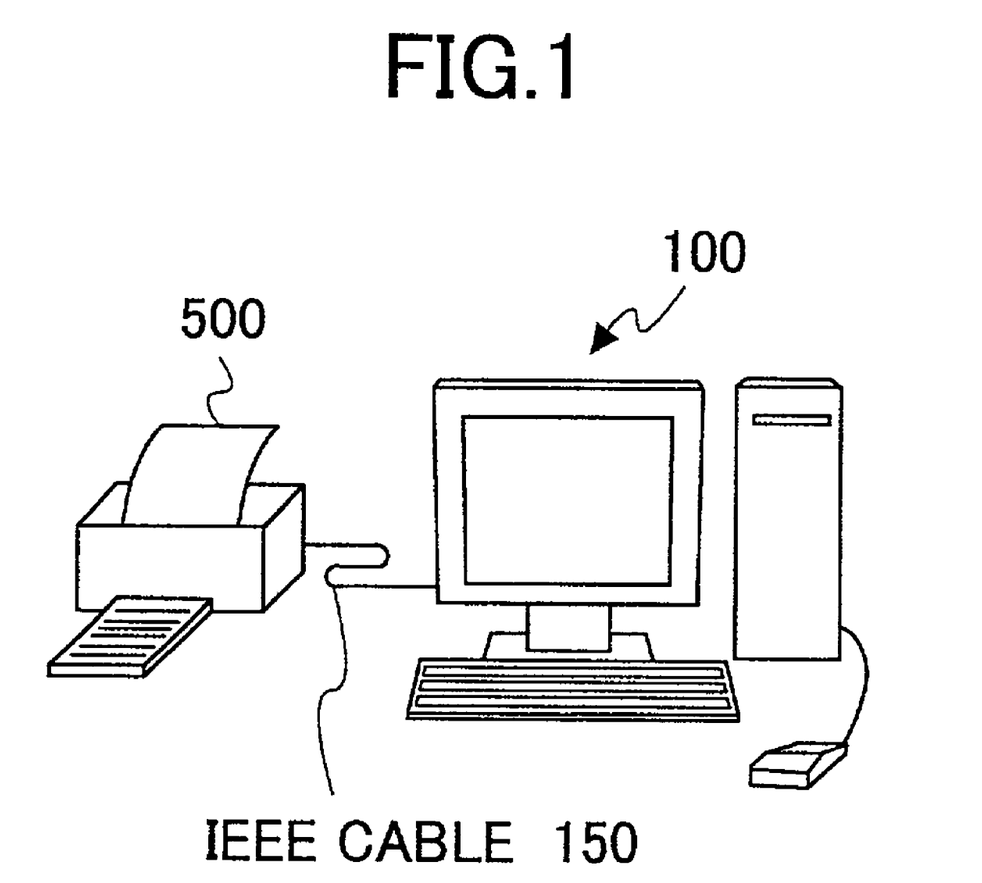

FIG. 1 shows a block diagram of a network in which a host computer 100 and a printer 500 are connected by a standard cable 150 in conformity with IEEE1394.a (which will be called an IEEE cable hereinafter). In the network, the host computer 100 includes an interface board in conformity with IEEE1394.a (which will be called an IEEE board hereinafter) which is an embodiment of the network interface of the present invention, and the printer 500 includes the same or different IEEE board.

When the power of the computer 100 and the printer 200 is turned on, each IEEE board performs a process of recognizing the network according to a protocol defined in IEEE1394.a.

Although the interface board (IEEE board) of the present invention is described by using an example in which the computer 100 and the printer 500 are connected, the interface board of the present invention can also be used in other devices, such as a storage device (HDD, CD/DVD drive and the like). The storage device which includes the interface board of the present invention can be connected to the computer 100, for example.

<2-1> IEEE Board

Figure 2:
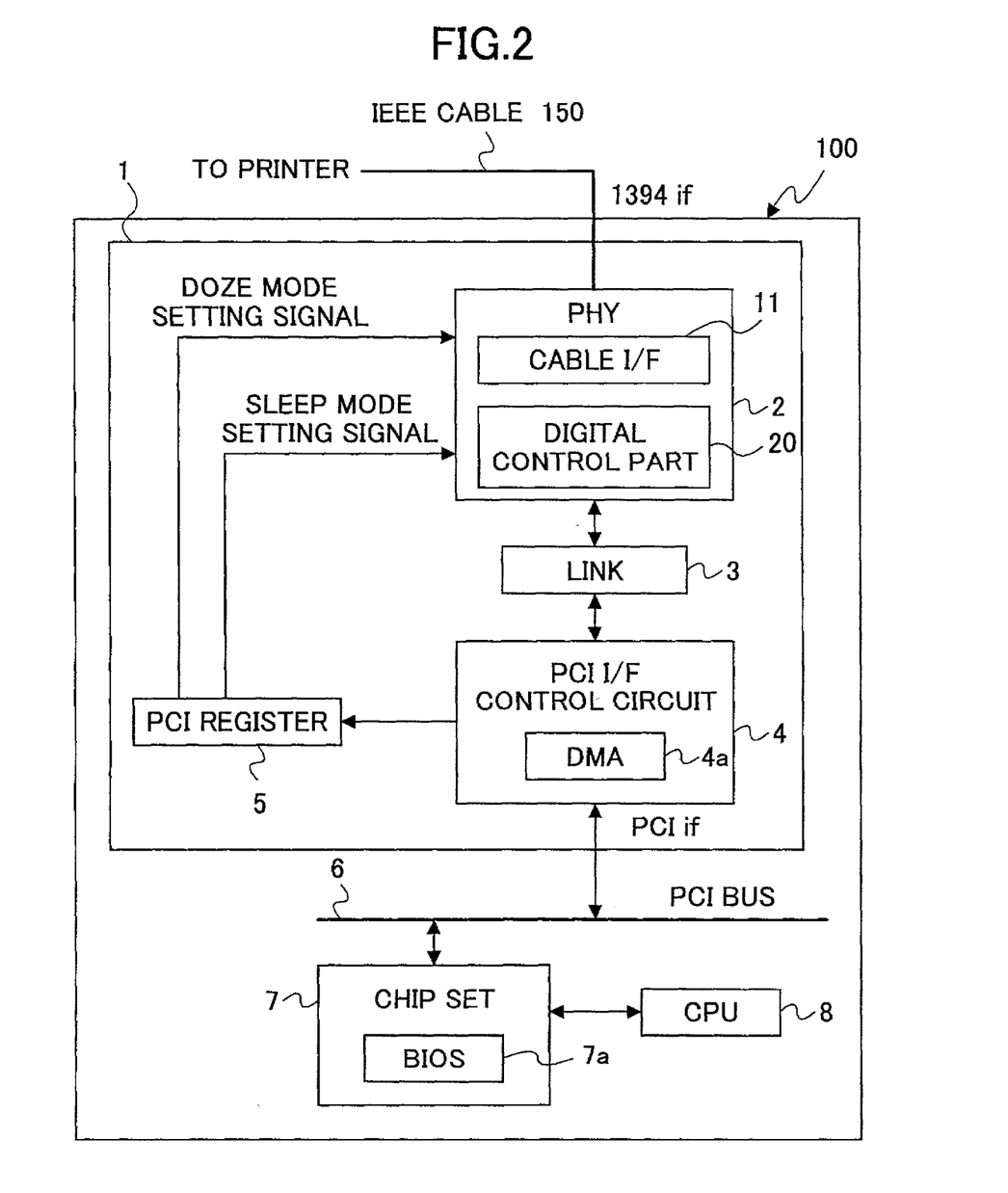
FIG. 2 is a block diagram of the inside of a computer in which the IEEE board is mainly shown.

In the following, the IEEE board 1 provided in the computer 100 will be described. FIG. 2 is a block diagram of a part relating to the IEEE board 1 which is an embodiment of the interface of the present invention in an inside circuit of the computer 100. The IEEE board is connected to a PCI bus 6. In addition to the IEEE board 1, a CPU 8 in the main body of the computer 100 is connected to the PCI bus 6 via a chip set (mother board) 7.

The IEEE board 1 includes a PHY chip 2, a LINK chip 3, a PCI I/F control circuit 4 which operates in accordance with OHCI (Open Host Controller Interface) Version 1.1, and a PCI register 5.

The disconnect mode and the suspend mode, in addition to the active mode, are provided in the IEEE board 1. The active mode is used when information such as packet data are exchanged between the printer 500 and the IEEE board 1. The disconnect mode is used when the printer 500 is not connected to the IEEE cable 150. The suspend mode is used when the printer 500 is connected to the IEEE cable 150, but the packet data is not sent or received.

The suspend mode may be established by a control signal input to the PHY chip 2 via the chip set 7, the PCI bus 6, a DMA 4a of the PCI I/F control circuit 4 and the LINK chip 3. More specifically, the suspend mode may be established by a D3 state setting signal output from a driver for power saving control in conformity with the PCI Power Management standard.

In the PCI Power Management standard, the returning time defined in the D3 state is 10 ms. As for the IEEE board 1, although returning time is large, a sleep mode can be used as the suspend mode. In the sleep mode, since the clock generation function including a PLL circuit is completely disabled, power saving effect can be realized at the maximum. Even when the sleep mode is used, since it takes several hundreds of microseconds—several milliseconds for the clock generation function to restart and operate stably, release process of the suspend mode can be completed within the defined returning time. Thus, as for the IEEE board 1, a specific protocol is not necessary, and general versatility is high.

Establishment of the active mode, the disconnect mode, and the suspend mode is performed in the PHY chip 2 in the IEEE board 1. The PHY chip 2 includes a cable I/F 11 and a digital control part 20 which processes a signal output from the cable I/F 11.

The cable I/F 11 outputs send/receive data to the digital control part. In addition, the cable I/F 11 outputs various signals including a connect detection signal and a bias detection signal, in which the connect detection signal enters an asserted state (becomes Low) when the printer 500 which is the opposite node is connected, and the bias detection signal enters an asserted state (becomes High) when packet data is sent or received.

Figure 3:
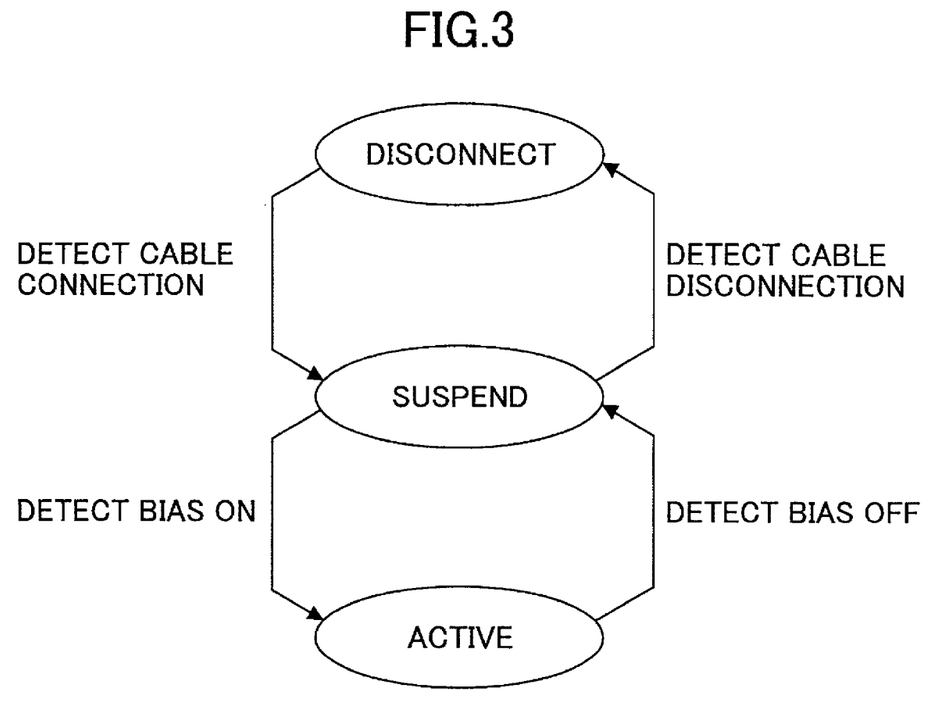
FIG. 3 is a figure for explaining mode changing.

The digital control part 20 establishes the disconnect mode, the suspend mode and the active mode according to a value of the connect detection signal and the Bias detection signal. FIG. 3 is a figure for explaining a transition of modes. The disconnect mode is established when the connect detection signal detected by the cable I/F 11 is in a negate state. The suspend mode is established when the connect detection signal is changed to the asserted state while the bias detection signal is in the negate state. While the suspend mode is established, when the bias detection signal is changed to the asserted state, the mode is changed to the active mode. On the other hand, when the active mode is established, the bias detection signal is changed to the negate state, the mode is changed to the suspend mode. In the suspend mode, when the connect detection signal is changed to the negate state, the disconnect mode is established.

In the IEEE board 1, there are two suspend modes one of which can be selected by a BIOS 7a in the chip set 7 shown in FIG. 2. The two suspend modes are a doze mode and a sleep mode.

In the doze mode, the disconnect mode or the suspend mode in conformity with the IEEE 1394.a is established in the PHY chip of the IEEE board 1, in addition, in the doze mode, the operation of a part of the clock generation mechanism in the PHY chip is stopped. Thus, in the doze mode, unnecessary power consumption in the clock generation mechanism in modes other than the active mode can be decreased. Power saving effect of the doze mode is smaller than that of the sleep mode, however, quick restart is available according to the doze mode. For example, by stopping/restarting only a part of clock generation mechanism other than the PLL circuit which requires time (several hundred microseconds—several milliseconds) for returning, restarting process can be completed within a returning time (200 μs) of the D2 state in conformity with the PCI Power management standard.

In the sleep mode, the disconnect mode or the suspend mode in conformity with the IEEE 1394.a is established in the PHY chip of the IEEE board 1, at the same time, in the sleep mode, the operation of the clock generation mechanism in the PHY chip is completely stopped. Thus, in the sleep mode, unnecessary power consumption in modes other than the active mode can be suppressed at the maximum. However since the clock generation mechanisms are completely stopped, for example, a period of time (several hundred microseconds—several milliseconds) is necessary for generating a stable clock signal.

The chip set 7 includes the BIOS 7a in which initial settings performed when starting the computer 100 are provided. By selecting data in the BIOS 7a, one of the sleep mode and the doze mode can be selected as the suspend mode when starting the computer 100. This setting is stored in the PCI register 5 as a two bit suspend mode setting signal via the PCI I/F control circuit 4 when starting the computer 100.

The PCI register 5 outputs the lower 1 bit of the suspend mode setting signal as a sleep mode setting signal, and outputs the upper 1 bit as the doze mode setting signal. These two signals takes exclusive values, in which when one is "H" (which means setting), another is "L" (which means cancel). That is, for establishing the sleep mode as the suspend mode, the sleep mode setting signal is set to "1", and the doze mode setting signal is set to "0". For establishing the doze mode, the sleep mode setting signal is set to "0", and the doze mode setting signal is set to "1".

<2-2> PHY Chip

Figure 4:
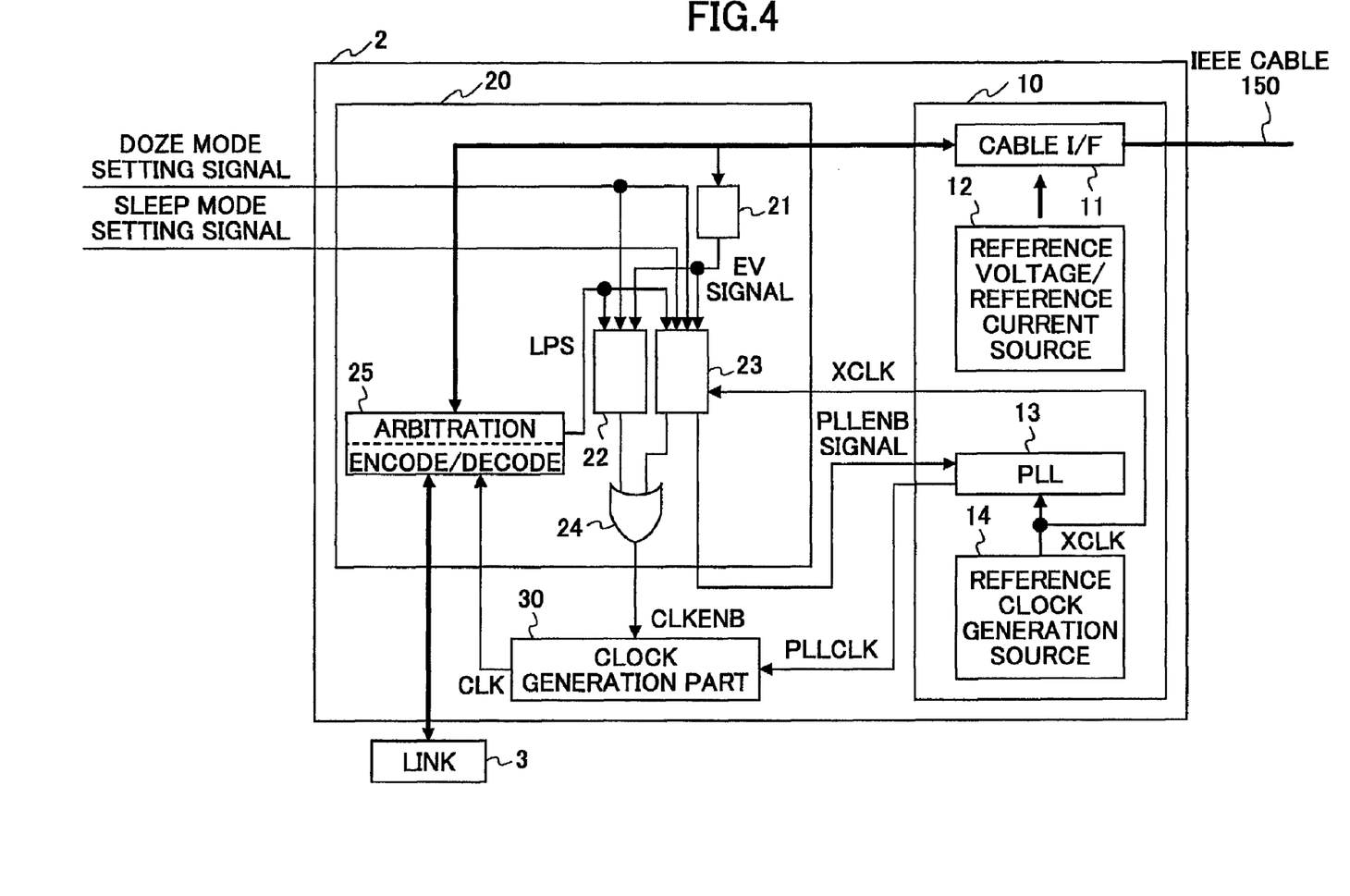
FIG. 4 is a block diagram of a PHY chip.

FIG. 4 shows a detailed block diagram of the PHY chip 2. The PHY chip 2 includes an analog block 10, a digital control part 20, and a clock generation part 30.

The analog block 10 includes a cable I/F 11, a reference voltage current source 12 for driving the cable I/F 11, a PLL circuit 13 and a reference clock origination source 14.

The reference clock origination source 14 is a so-called oscillator 14, and it generates a reference clock signal XCLK of low frequency. The PLL circuit 13 multiplies the frequency of the clock signal XCLK so as to generate a clock signal PLLCLK having high frequency (400 MHz, usually). The clock generation part 30 performs frequency dividing process on the clock signal PLLCLK, so that the clock generation part 30 generates various kinds of driving clock signals CLK used in the digital control part 20. The digital control part 20 operates on the basis of the driving clocks CLK, and the digital control part 20 stops the operation when input of the driving clock signals CLK stops. The clock generation part 30 operates when a CLKENB signal from the digital control circuit 20 is "L", and the clock generation part 30 stops the operation when the CLKENB signal is "H". The PLL circuit 13 operates when the PLLENB signal from the digital control circuit 20 is "L", and stops when the PLLENB signal is "H".

The digital control part 20 includes an event detection circuit 21, a doze mode control circuit 22, a sleep mode control circuit 23, an OR gate 24 and an arbitration/encode decode part 25.

The event detection circuit 21 outputs an event signal of "H" when the state (mode) of the IEEE board 1 changes. The event detection circuit will be described later in detail.

The doze mode control circuit 22 operates when the dose mode is established as the suspend mode by the BIOS 7a. When the suspend mode is established, the operation of the clock generation part 30 is stopped by changing the CLKENB signal from "L" to "H". When the release condition of the suspend mode is satisfied, that is, according to variation of the event signal output from the event detection circuit 21 and the LPS (Link power Status) signal output from the LINK chip 3, the clock generation part 30 is restarted by returning the CLKENB signal from "H" to "L". The LPS signal is a signal indicating whether the LINK chip 3 is in an operating state or not. When the LINK chip 3 is operating, "H" is set to the LPS signal. The doze mode control circuit 22 will be described later in detail.

The sleep mode control circuit 23 operates when the sleep mode is set as the suspend mode by the BIOS 7a. When the suspend mode is established, operations of the clock generation part 30 and the PLL circuit 13 are stopped by changing both of the CLKENB signal output to the clock generation part 30 and the PLLENB signal output to the PLL circuit 13 from "L" to "H". When the release condition of the suspend mode is satisfied, that is, according to variation of the event signal output from the event detection circuit 21 and the LPS (Link power Status) signal output from the LINK chip 3, the clock generation 30 and the PLL circuit 13 are restarted by returning the CLKENB signal and the PLLENB signal from "H" to "L". The sleep mode control circuit 23 will be described later in detail.

The OR gate 24 is a gate for adjusting CLKENB signals output from the doze mode control circuit 22 and from the sleep mode control circuit 23. The OR gate 24 outputs a signal which is output from a control circuit of an effective mode to the clock generation part 30 as the CLKENB signal. The sleep mode control circuit 23 always outputs the PLLENB signal of "L" to the PLL circuit 13 when the doze mode is established.

The arbitration/encode decode part 25 operates according to the various kinds of driving clocks prepared by the clock generation part 30. The arbitration/encode decode part 25 processes send/receive data output from the cable I/F 11 of the analog block 10 in conformity with IEEE1394.a, and outputs the processed data to the LINK chip 3.

<2-3> Cable I/F

Figure 5:
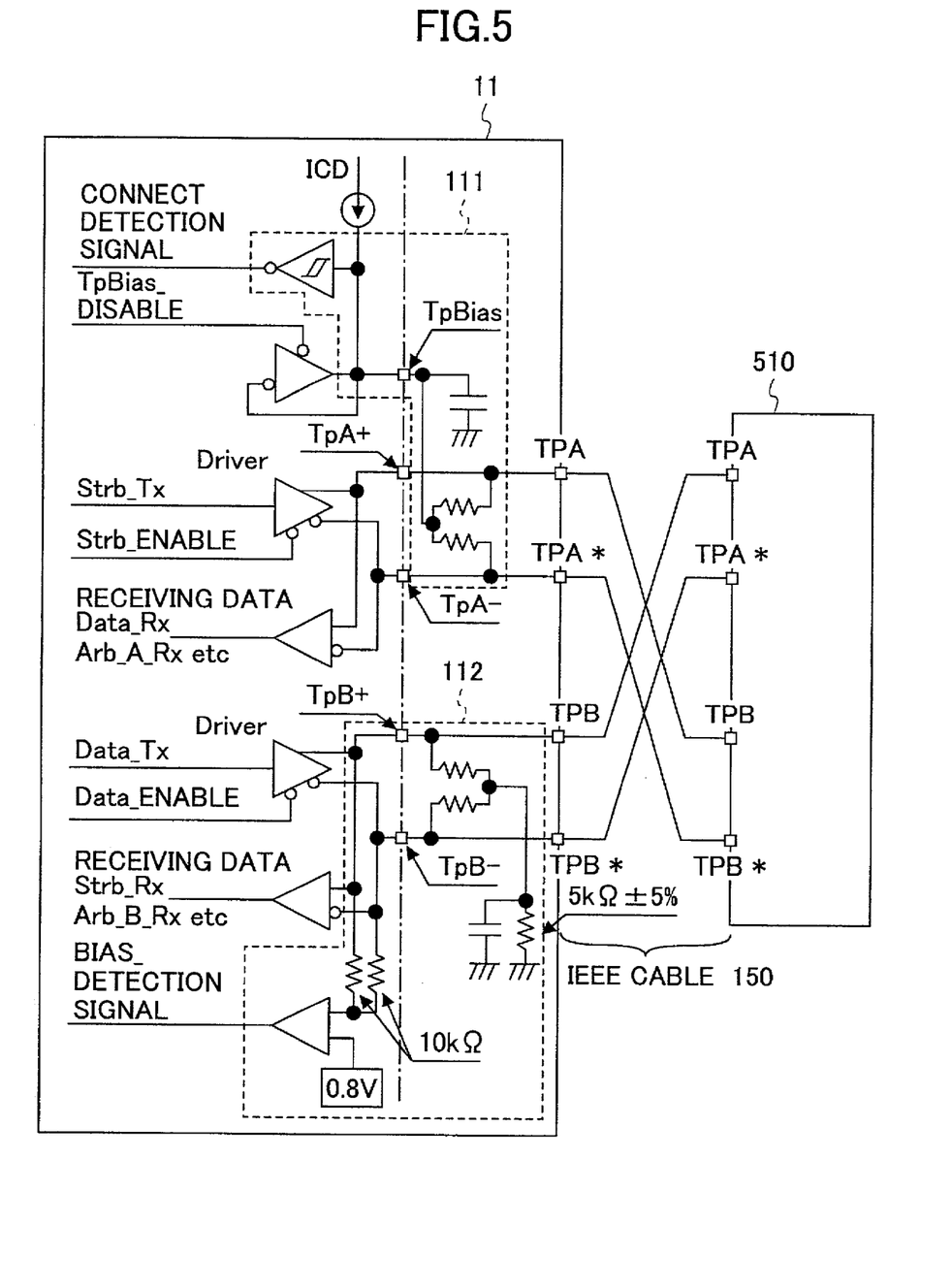
FIG. 5 is a block diagram of a cable I/F.

FIG. 5 shows a basic configuration of the cable I/F11, a cable I/F 150 and a cable I/F 510 included in the printer 500 which is the opposite node. The cable I/F includes a connect detection circuit 111, a bias detection circuit 112, TpBias detection circuit and a send/receive circuit.

The connect detection circuit 111 outputs the connect detection signal on the basis of variation of voltage between twisted lines of TPA and TPA* in the IEEE cable 150, in which the variation occurs when the IEEE cable 150 is connected to or disconnected from the printer 500. That is, when the printer 500 is connected to the IEEE cable 150, the connect detection circuit 111 outputs the connect detection signal of "L", and outputs "H" when the printer 500 is disconnected from the IEEE cable 150.

The bias detection circuit 112 outputs the bias detection signal of "H" when it detects a bias signal applied to the cable when information such as packet data is sent/received. When the bias signal is not output, the bias detection circuit 112 outputs the bias detection signal of "L". The configuration of the cable I/F conforms to the IEEE1394.a standard, thus, the IEEE1394.a standard can be referred to for more detailed description.

<2-4> Event Detection Circuit

Figure 6:
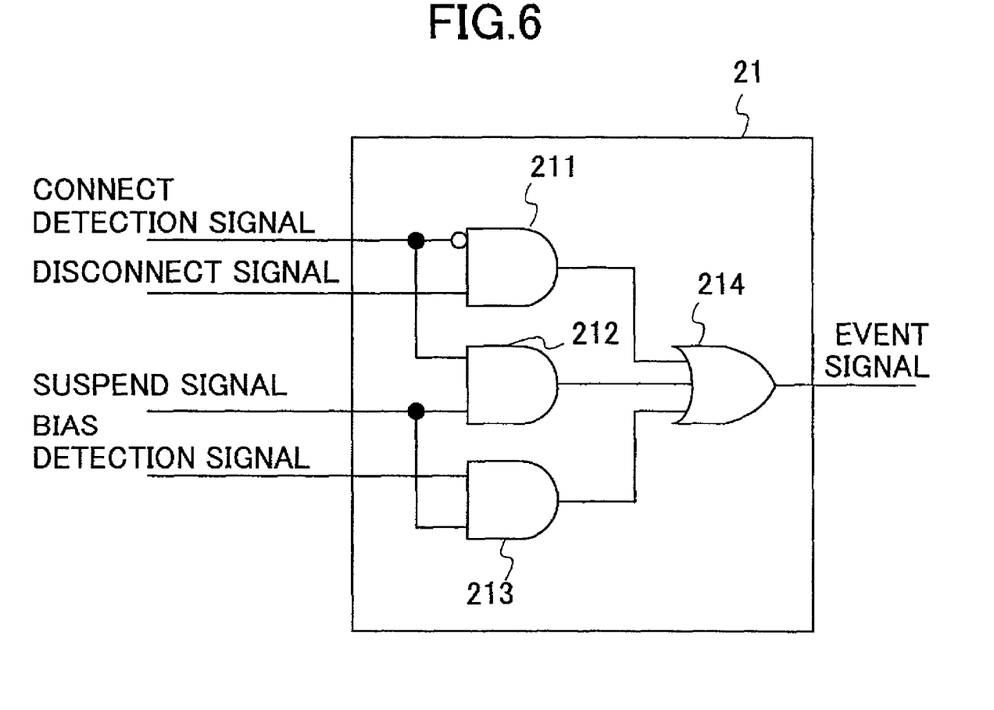
FIG. 6 is a block diagram of an event detection circuit.

FIG. 6 is a block diagram of the event detection circuit 21. The event detection circuit 21 includes three two-input AND gates 211-213, and a three-input OR gate 214. An input terminal of the AND gate 211 receives a connect detection signal via an inverter, and another input terminal receives a disconnect signal which is set to "H" when the disconnect mode is established. An input terminal of the AND gate 212 receives the connect detection signal, and another input terminal receives a suspend signal which is set to "H" when the suspend mode is established. An input terminal of the AND gate 213 receives the suspend signal via an inverter, and another input terminal receives a bias detection signal. Each of output terminals of the AND gates 211-213 is connected to an input terminal of the OR gate 214.

The event detection circuit 21 outputs an event signal of "L" when the disconnect mode or the suspend mode is established in the digital control part 20. In the disconnect mode, when the printer 500 which is the opposite node is connected, that is, when the connect detection signal is changed to "H" to "L", the event signal is changed from "L" to "H". In the suspend mode, when the printer 500 is disconnected, that is, when the connect detection signal is changed from "L" to "H", or, when exchange of information such as packet data with the printer 500 starts, that is, when the bias detection signal is changed from "L" to "H", the event signal is changed from "L" to "H".

When the IEEE board 1 includes a plurality of ports, that is, the IEEE boards 1 includes a plurality of cable I/Fs, a following configuration can be adopted. The event detection circuit 21 is provided for each cable I/F, and an AND gate for calculating logical multiplication of all event signals output from the event detection circuits is provided. Accordingly, the final event detection signal is output from the AND gate.

In addition, a configuration can be adopted in which the AND gate calculates logical multiplication of a part of all event detection signals for convenience of design or as necessary.

<2-5> Doze Mode Control Circuit

Figure 7:
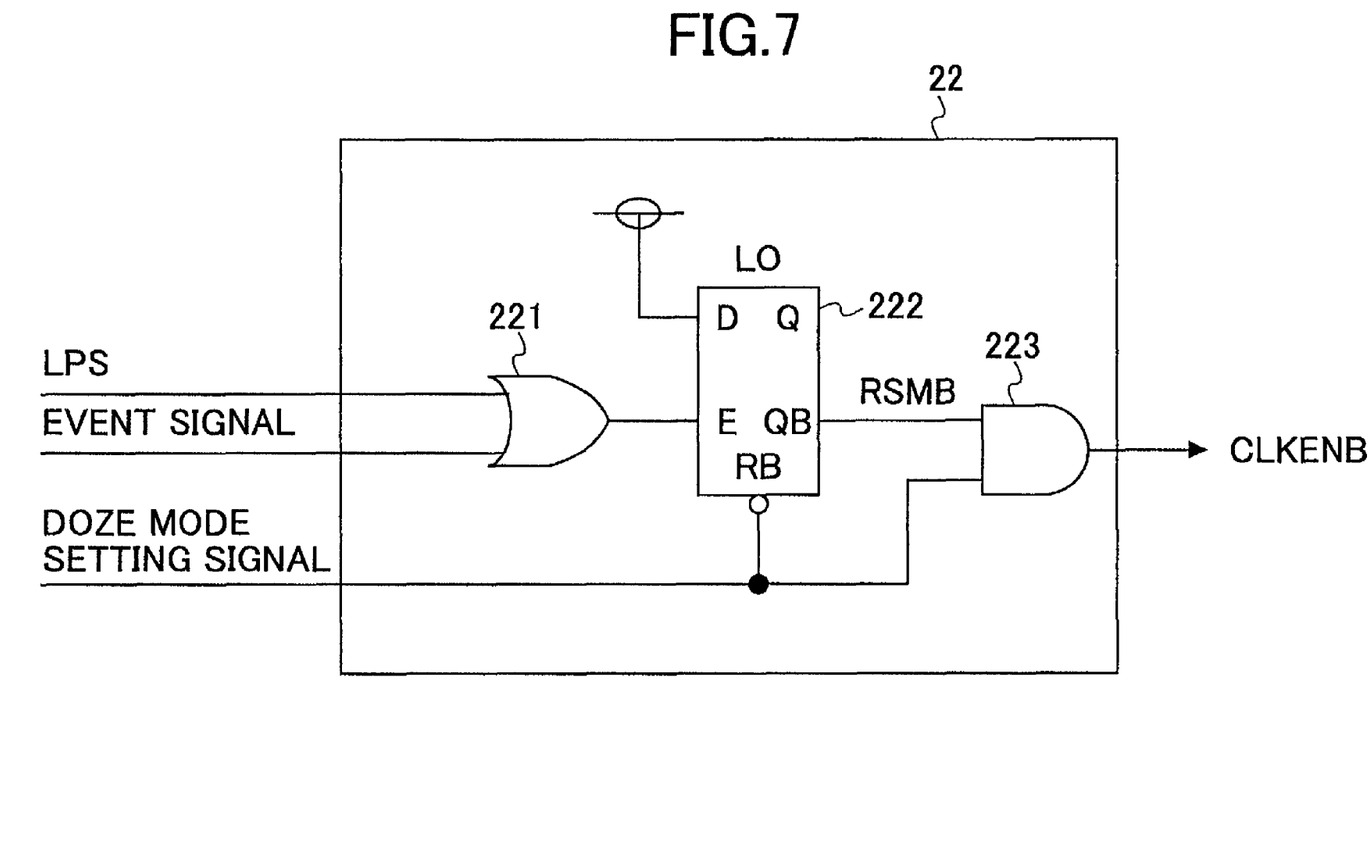
FIG. 7 is a block diagram of a doze mode control circuit.

The doze mode control circuit 22 functions effectively when the doze mode setting signal is "H". The doze mode control circuit 22 stops the operation of the clock generation part 30 by changing the CLKENB signal from "L" to "H" when the suspend mode is established, that is, when both of the LPS signal and the event signal become "L". When either of the LPS signal or the event signal changes from "L" to "H", the clock generation part 30 is restarted by changing the CLKENB signal from "H" to "L".

Figure 8:
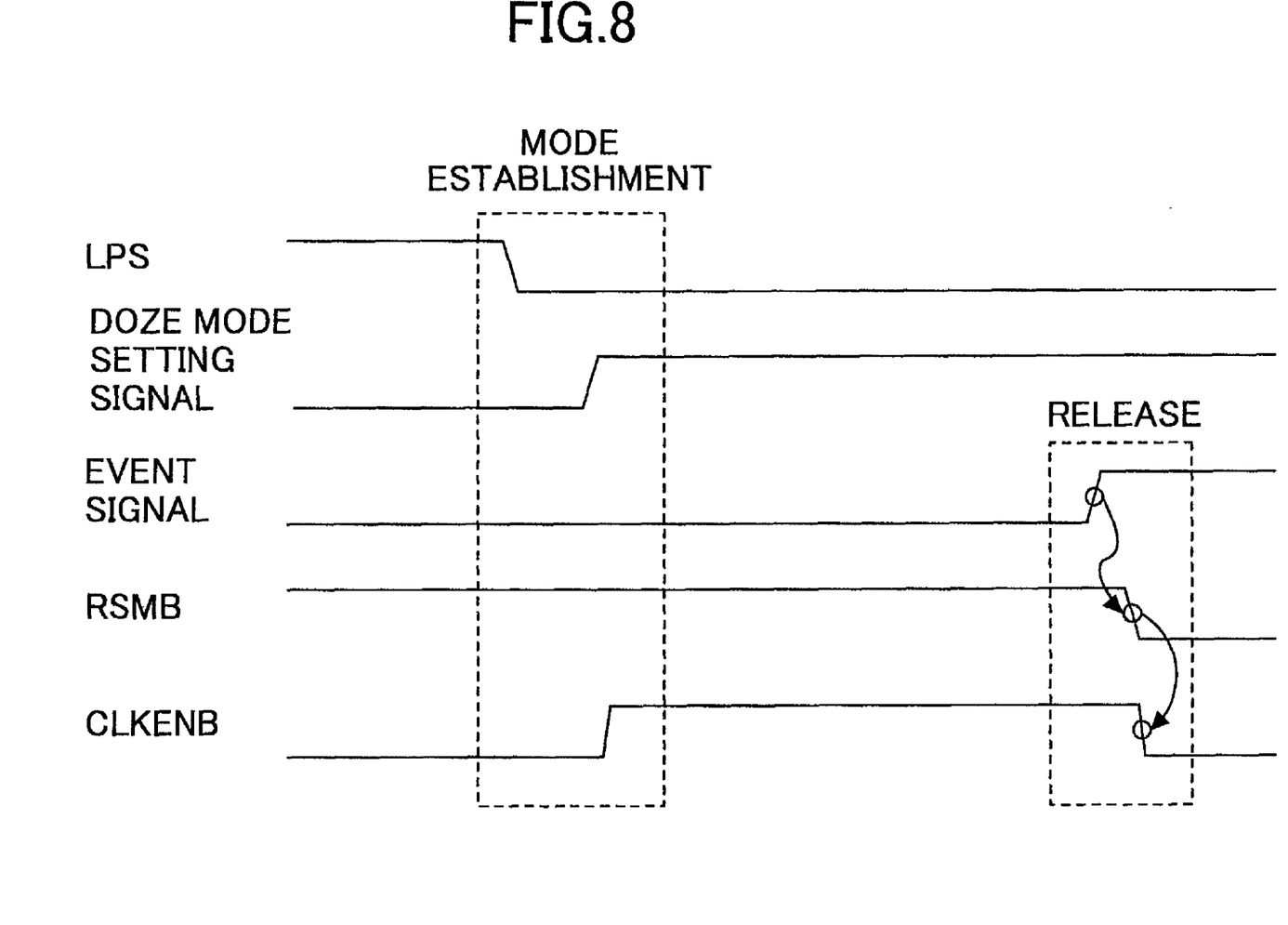
FIG. 8 is a time chart showing signals in the doze mode control circuit.

FIG. 7 is a block diagram of the doze mode control circuit 22. FIG. 8 is a time chart showing variation of signal state from establishment of the disconnect mode or the suspend mode to change of the CLKENB signal due to mode change. The doze mode control circuit 22 includes a two-input one-output OR gate 221, a latch 222, and an AND gate 223. One input terminal of the OR gate 221 receives an LPS signal output from the LINK chip 3, and another input terminal receives an event signal output from the event detection circuit 21. The OR gate 221 outputs a signal of "H" to an enable terminal E of the latch 222 when either of the LPS signal or the event signal is changed to "H". The reset terminal RB of the latch 222 receives the doze mode setting signal, and the data input terminal D receives a signal of "H" level.

As shown in the time chart in FIG. 8, when the LINK chip 3 is disabled and when the disconnect mode or the suspend mode is established, that is, when both of the LPS signal and the event signal are "L", the latch 222 outputs an RSMB signal of "H". In this case, the AND gate 223 outputs the CLKENB signal of "H".

When data exchange in the link is started and the LPS signal is changed from "L" to "H", or when the opposite node is connected/disconnected and data exchange is started, and the event signal is changed from "L" to "H" (in the case of FIG. 8), the RSMB signal output from the data output terminal QB of the latch 222 is changed from "H" to "L". Accordingly, the CLKENB signal is changed from "H" to "L", so that the clock generation part is restarted.

<2-6> Sleep Mode Control Circuit

Figure 9:
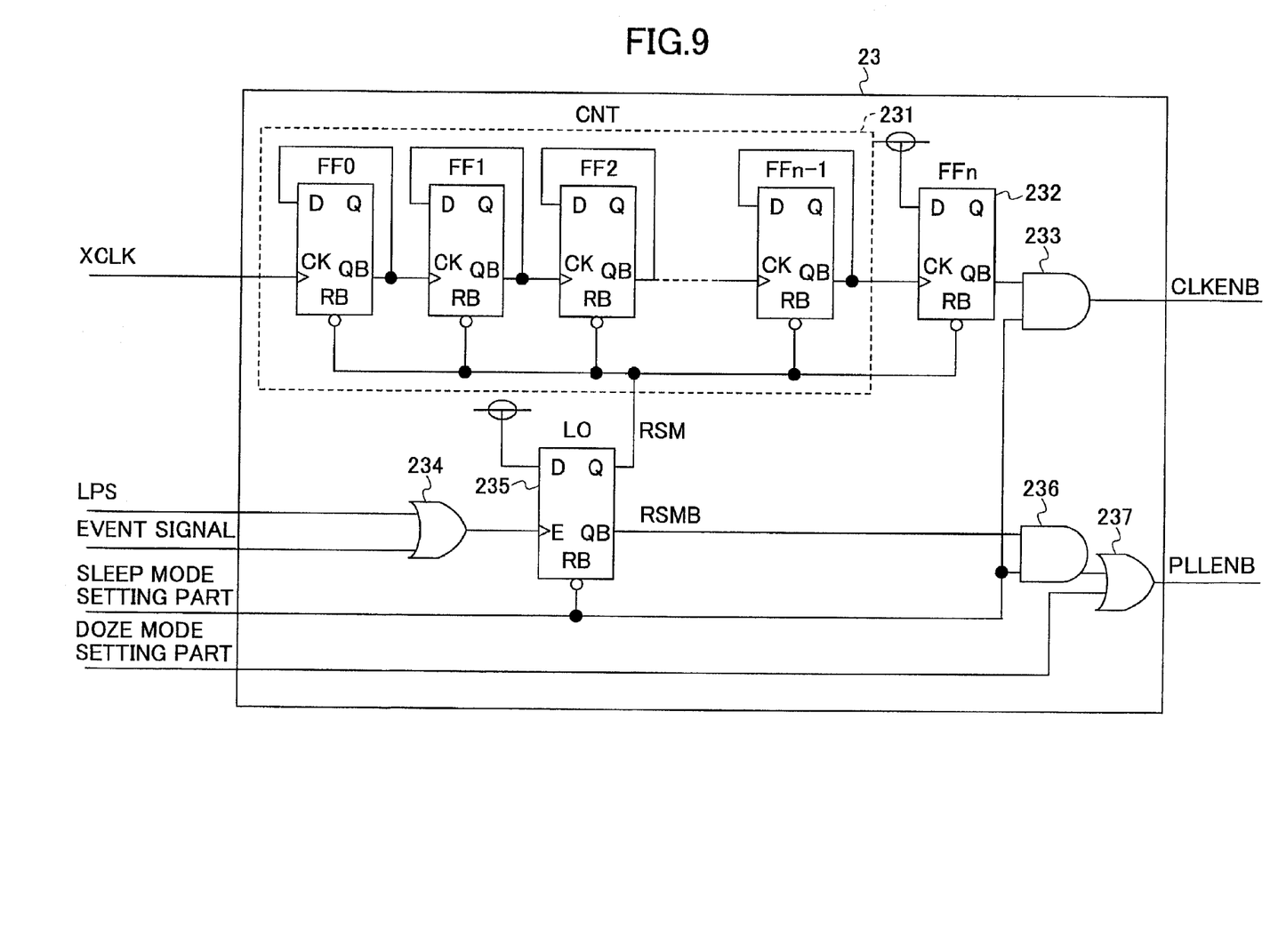
FIG. 9 is a block diagram of a sleep mode control circuit.

The sleep mode control circuit 23 functions effectively when the sleep mode setting signal is "H". When the disconnect mode or the suspend mode is established, that is, when both of the LPS signal and the event signal become "L", the clock generation part 30 and the PLL circuit 13 are stopped by changing the CLKENB signal and the PLLENB signal from "L" to "H". When either of the LPS signal or the event signal changes from "L" to "H", the PLL circuit 13 is restarted by changing PLLENB signal from "H" to "L" first since it takes time for the PLL circuit 13 to output a stable frequency clock signal after restarting. Next, the clock generation part 30 is restarted by changing the CLKENB signal from "H" to "L" after waiting a time necessary for starting the PLL circuit 13 by using a timer.

FIG. 9 is a block diagram of the sleep mode control circuit 23. The sleep mode control circuit 23 includes a count circuit 231, a flip-flop 232, a latch 235, AND gates 233, 236 and OR gates 234, 237.

The count circuit 231 is configured such that a plurality of flip-flops are connected in series, and the count circuit 231 receives a clock signal XCLK which is output from the reference clock origination source 14 as a clock signal (enable signal). Reset terminals RB of the count circuit 231 receive an RSM signal output from the output terminal Q of the latch 235. A clock terminal CK of the flip-flop 232 receives an output QB of the count circuit 231, and a reset terminal RB receives a signal from a data output terminal D of the latch 235. A data input terminal D receives a signal of "H". A data output terminal QB of the flip-flop 232 is connected to an input terminal of the two-input AND gate 233. Another input terminal of the AND gate 233 receives the sleep mode setting signal. An output terminal of the AND gate 233 outputs a CLKENB signal.

An input terminal of the two-input OR gate 234 receives an LPS signal, and another input terminal receives an event signal. An output signal of the OR gate 234 is received by the clock terminal CK of the latch 235. A reset terminal RB of the latch 235 receives a sleep mode setting signal, and a data input terminal D of the latch 235 receives a signal of "H". An output terminal QB of the latch 235 outputs an RSMB signal. An input terminal of the two-input AND gate 236 receives the RSMB signal, and another input terminal receives the sleep mode setting signal. An input terminal of the two-input OR gate 237 is connected to an output terminal of the AND gate 236, and another input terminal receives a doze mode setting signal. An output terminal of the OR gate 237 outputs a PLLENB signal.

Figure 10:
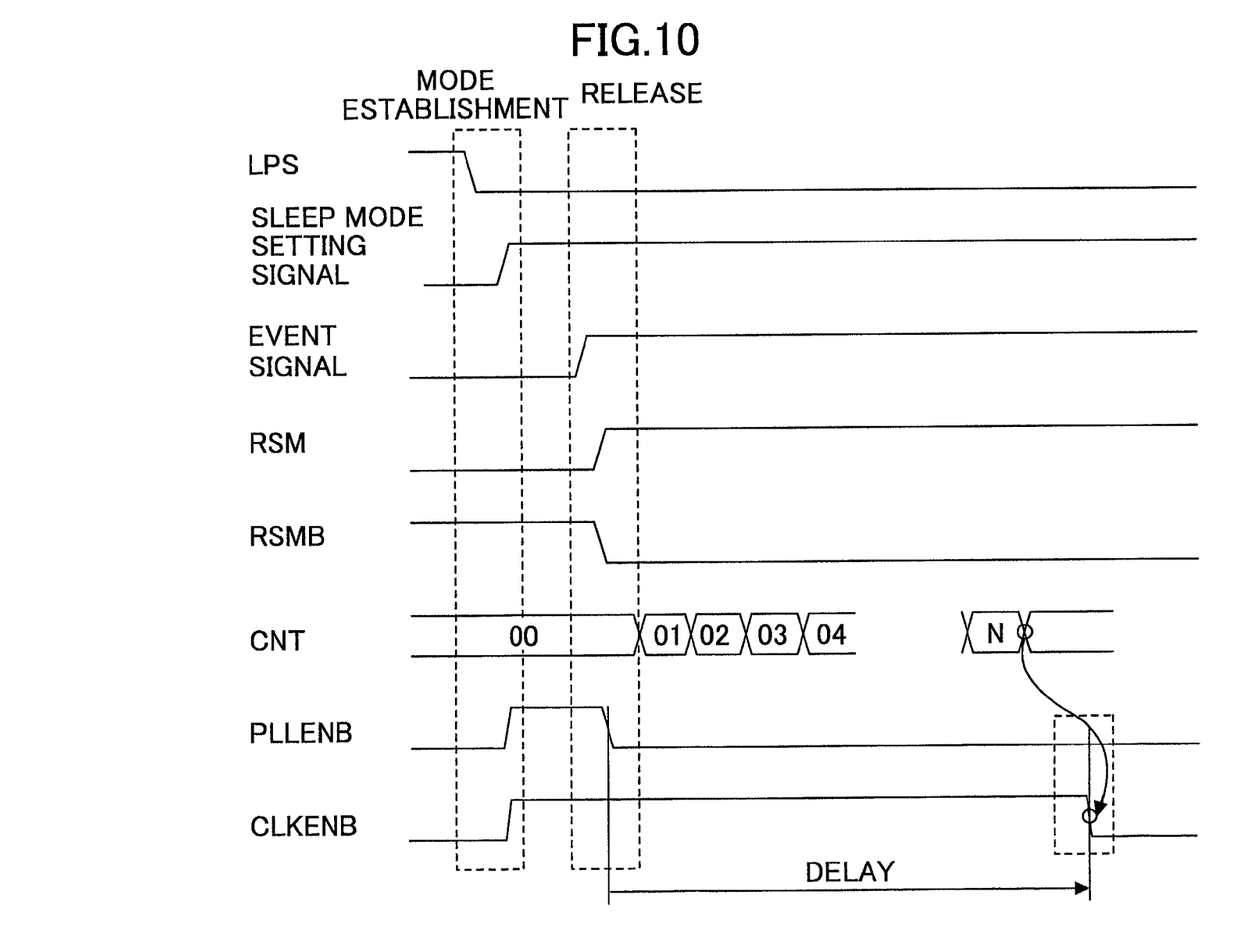
FIG. 10 is a time chart showing signals in the sleep mode control circuit.

FIG. 10 is a time chart showing variation of signal state from establishment of the disconnect mode or the suspend mode to the change of the CLKENB signal and the PLLENB signal due to mode change. When the sleep mode setting signal is set to be "H", and when data is not sent or received in the link and when the disconnect mode or the suspend mode is established, that is, when both of the LPS signal and the event signal are "L", the data output terminal Q of the latch 235 outputs an RSM signal of "L", and the data output terminal QB outputs an RSMB signal of "H". In this case, the AND gate 233 outputs a CLKENB signal of "H", and the OR gate 237 outputs a PLLENB signal of "H".

When data starts to be sent or received in the link so that the LPS signal changes from "L" to "H", or when the event signal is changed from "L" to "H" when the opposite node is connected or disconnected and the packet data starts to be sent or received (in the case of FIG. 10), the RSMB signal output from the data output terminal QB of the latch 235 is changed from "H" to "L". Then, the PLLENB signal changes from "H" to "L", so that the PLL circuit 13 is restarted.

The RSM signal output from the data output terminal Q of the latch 235 changes from "L" to "H", so that the count circuit 231 is started. After the clock signal cycles by the times of the number of flip-flops included in the count circuit 231, the CLKENB signal output from the AND gate 233 is changed from "H" to "L", so that the clock generation part 30 is restarted. As mentioned above, the count circuit 231 functions as a timer. The number of the flip-flops included in the count circuit 231 is the number necessary for delaying changing time of CLKENB for a time necessary for enabling the PLL circuit 13 to output a stable PLLCLK after being started.

The IEEE board 1 described above selects the doze mode or the sleep mode as the suspend mode according to the setting of the BIOS 7a. In addition, either of the selected modes is established according to the D3 state setting signal in conformity with the PCI Power management standard. However, a configuration can be also adopted in which, irrespective of modes established as the suspend mode by the BIOS 7a, the sleep mode is established according to the D3 state setting signal, and the doze mode is established according to the D2 state setting signal.

According to the first network interface of the present invention, when the disconnect mode or the suspend mode is established, at least a part of the clock generation circuits in the network interface is stopped. Since the driving control circuit operates irrespective of clock signals, the driving control circuit continues to operate even when the clock generation circuit stops. When the release condition of the mode is satisfied, the clock generation circuit is restarted. By adopting this configuration, power consumption of the interface can be largely decreased when the disconnect mode and the suspend mode are established.

In the second network interface of the present invention, at least a part of the clock generation circuits is stopped until the event detection circuit detects change of relationship between the node itself and the opposite node (connection/disconnection of nodes, start of sending/receiving of packet data) as an occurrence of an event. Since the driving control circuit operates irrespective of clock signals, the driving control circuit continues to operate even when the clock generation circuit stops. When the event detection circuit detects change of relationship with the opposite node, the clock generation circuit is restarted. By adopting this configuration, power consumption of the interface can be largely decreased when the disconnect mode and the suspend mode are established.

In the third network interface of the present invention, at least a part of the clock generation circuits is stopped until the event detection circuit detects change of relationship between the node itself and the opposite node (connection/disconnection of node, start of sending/receiving of packet data) or change of a predetermined internal signal as an occurrence of an event. Since the driving control circuit operates irrespective of clock signals, the driving control circuit continues to operate even when the clock generation circuit stops. When the event detection circuit detects change of relationship with the opposite node, the clock generation circuit is restarted. By adopting this configuration, power consumption of the interface can be largely decreased when the disconnect mode and the suspend mode are established.

The fourth network interface of the present invention is in conformity with the IEEE1394.a standard, in which it is detected that the release condition of a mode is satisfied by using circuits which are not driven by a clock signal such as a connect detection circuit and the like included in the cable I/F, and the clock generation circuit which is stopped is restarted. By adopting this configuration, power consumption of the interface can be largely decreased when the disconnect mode and the suspend mode are established.

In the fifth network interface of the present invention, it is judged that the mode release condition is satisfied when the LPS signal output from the LINK chip changes, and the clock generation circuit which is stopped is restarted, in the fourth network interface. By adopting this configuration, power consumption of the interface can be largely decreased when the disconnect mode and the suspend mode are established.

The present invention is not limited to the specifically disclosed embodiments, and variations and modifications may be made without departing from the scope of the invention.

What is claimed is:

1. A network interface through which a resident device connects with a network to communicate with an opposite node on said network, said network interface comprising:
   one or more driving clock generation circuits;
   a PLL circuit configured to provide a clock signal to said one or more driving clock generation circuits; and
   a driving control circuit configured to control said PLL circuit and said one or more driving clock generation circuits to stop generation of clock signals by said one or more driving clock generation circuits in said network interface and to stop generation of the clock signal by the PLL circuit, when a disconnect mode is established when said opposite node is not connected to said network,
   wherein said driving control circuit controls said PLL circuit to resume generation of said clock signal when a release condition of said disconnect mode of said network interface is satisfied, and controls said one or more driving clock generation circuits to resume said generation of clock signals, when a predetermined time elapses after said release condition of said disconnect mode of said network interface is satisfied;
   wherein said driving control circuit of said network interface includes a timer which determines whether said predetermined time has elapsed after said release condition has been satisfied.

2. The network interface as claimed in claim 1, said driving control circuit comprising:

an event detection circuit for detecting a change of a state between said network interface and a connected node as occurrence of an event; and a clock control circuit for stopping at least a part of driving clock generation circuits included in said network interface until occurrence of said event is detected by said event detection circuit from the time when said disconnect mode is established.

3. The network interface as claimed in claim 2, wherein said event detection circuit detects a change of a state between said network interface and a connected node, or a change of a state of a predetermined signal in said network interface as occurrence of said event.

4. The network interface as claimed in claim 2, wherein said event detection circuit detects occurrence of said event on the basis of variation of at least one of a connect detection signal and a bias detection signal, in which said connect detection signal is detected by a connect detection circuit in a cable interface provided in said network interface and said bias signal is detected by a bias detection circuit in said cable interface.

5. The network interface as claimed in claim 2, wherein said event detection circuit detects occurrence of said event on the basis of variation of at least one of a connect detection signal, a bias detection signal and a Link Power Status (LPS) signal, in which said connect detection signal is detected by a connect detection circuit in a cable interface provided in said network interface, said bias detection signal is detected by a bias detection circuit in said cable interface, and LPS signal is output from an LINK chip provided in said network interface.

6. The network interface as claimed in claim 1, wherein said network interface connects at least one of a computer, a computer peripheral device and a storage device, to a network.

7. The network interface as claimed in claim 6, wherein said network interface recognizes the network according to a network protocol used in the network.

8. The network interface as claimed in claim 1, further comprising one or more power consuming parts, and said clock signal is supplied to said one or more power consuming parts when said driving clock generation circuits are not stopped.

9. The network interface as claimed in claim 1, further comprising one or more power consuming parts, wherein said one or more power consuming parts consume no substantial power when said one or more power consuming parts do not receive clock signals in said disconnect mode.

10. The network interface as claimed in claim 1, wherein said one or more driving clock generation circuits includes a Phase Lock Loop (PLL) circuit, and wherein said driving control circuit controls said PLL circuit in said one or more driving clock generation circuits to stop generation of clock signals by said one or more driving clock generation circuits.

11. The network interface as claimed in claim 1, further comprising an interface circuit configured to generate a connect detection signal and a bias detection signal, wherein said connect detection signal is asserted when the opposite node is connected to the network, and said bias detection signal is asserted when data is sent or received through said network by said network interface.

12. The network interface as claimed in claim 1, wherein said driving control circuit controls said one or more driving clock generation circuits to stop generation of said clock signals by said one or more driving clock generation circuits in said network interface, when a suspend mode is established, and resume said generation of clock signals by said one or more driving clock generation circuits in said network interface, when a release condition of said suspend mode of said network interface is satisfied, and wherein said suspend mode is established when said opposite node is connected and no data is being sent to or received from said opposite node.

13. A computer including a network interface for communicating via a network with an opposite node on said network, said network interface having an active mode and a disconnect mode, said network interface performing a predetermined process when an establishment condition or release condition of said disconnect mode is satisfied, said network interface comprising:

one or more driving clock generation circuits;

a PLL circuit configured to provide a clock signal to said one or more driving clock generation circuits; and a driving control circuit configured to control said PLL circuit and at least a part of said one or more driving clock generation circuits to stop generation of clock signals by said one or more driving clock generation circuits in said network interface and to stop generation of the clock signal by the PLL circuit, when said disconnect mode is established when said opposite node is not connected to said network, wherein said driving control circuit controls said PLL circuit to resume generation of said clock signal when the release condition of said disconnect mode of said network interface is satisfied, and controls said one or more driving clock generation circuits to resume said generation of clock signals, when a predetermined time elapses after said release condition of said disconnect mode of said network interface is satisfied;

wherein when said driving control circuit stops said at least a part of said one or more driving clock generation circuits, clock signals are not generated; and wherein said driving control circuit of said network interface includes a timer which determines whether said predetermined time has elapsed after said release condition has been satisfied.

14. A printer including a network interface for communicating via a network with an opposite node on said network, said network interface having an active mode and a disconnect mode, said network interface performing a predetermined process when an establishment condition or release condition of said disconnect mode is satisfied, said network interface comprising:

one or more driving clock generation circuits;

a PLL circuit configured to provide a clock signal to said one or more driving clock generation circuits; and a driving control circuit configured to control said PLL circuit and said one or more driving clock generation circuits to stop generation of clock signals by said one or more driving clock generation circuits in said network interface and to stop generation of the clock signal by the PLL circuit, when said disconnect mode is established when said opposite node is not connected to said network, wherein said driving control circuit controls said PLL circuit to resume generation of said clock signal when the release condition of said disconnect mode of said network interface is satisfied, and controls said one or more driving clock generation circuits to resume said generation of clock signals, when a predetermined time elapses after said release condition of said disconnect mode of said network interface is satisfied;

wherein said driving control circuit of said network interface includes a timer which determines whether said predetermined time has elapsed after said release condition has been satisfied.

15. A storage device including a network interface for communicating via a network with an opposite node on said network, said network interface having an active mode and a disconnect mode, said network interface performing a predetermined process when an establishment condition or release condition of said disconnect mode is satisfied, said network interface comprising:
   one or more driving clock generation circuits;
   a PLL circuit configured to provide a clock signal to said one or more driving clock generation circuits; and
   a driving control circuit configured to control said PLL circuit and at least a part of said one or more driving clock generation circuits to stop generation of clock signals by said one or more driving clock generation circuits in said network interface and to stop generation of the clock signal by the PLL circuit, when said disconnect mode is established when said opposite node is not connected to said network,
   wherein said driving control circuit controls said PLL circuit to resume generation of said clock signal when the release condition of said disconnect mode of said network interface is satisfied, and controls said one or more driving clock generation circuits to resume said generation of clock signals, when a predetermined time elapses after said release condition of said disconnect mode of said network interface is satisfied;
   wherein said driving control circuit of said network interface includes a timer which determines whether said predetermined time has elapsed after said release condition has been satisfied.

16. A network interface through which a resident device connects with a network to communicate with another device on said network, said network interface comprising:
   an interface circuit configured to generate a connect detection signal that is asserted when said another device is connected to the network, and generate a bias detection signal that is asserted when data is sent or received through said network by said network interface;
   a control part configured to establish a disconnect mode in said network interface when the connect detection signal is not asserted;
   one or more driving clock generation circuits;
   a PLL circuit configured to provide a clock signal to said one or more driving clock generation circuits;
   a driving control circuit configured to control said PLL circuit and said one or more driving clock generation circuits to stop generation of clock signals by said one or more driving clock generation circuits in said network interface and to stop generation of the clock signal by the PLL circuit, when said disconnect mode is established when said opposite node is not connected to said network,
   wherein said driving control circuit controls said PLL circuit to resume generation of said clock signal when a release condition of said disconnect mode of said network interface is satisfied, and controls said one or more driving clock generation circuits to resume said generation of clock signals, when a predetermined time elapses after said release condition of said disconnect mode of said network interface is satisfied,
   wherein said driving control circuit of said network interface includes a timer which determines whether said predetermined time has elapsed after said release condition has been satisfied.

17. A computer including the network interface of claim 16.

18. A printer including the network interface of claim 16.

19. A storage device including the network interface of claim 16.

20. The network interface as claimed in claim 16, wherein said control part establishes a suspend mode in said network interface when the connect detection signal is asserted and the bias detection signal is not asserted.

* * * * *